US011317298B2

(12) United States Patent
Notargiacomo et al.

(10) Patent No.: US 11,317,298 B2
(45) Date of Patent: Apr. 26, 2022

(54) FRONTHAUL SYSTEM FOR A WIRELESS TELECOMMUNICATION NETWORK HAVING UPLINK SYNCHRONIZATION AND SUMMING

(71) Applicant: TEKO TELECOM S.R.L., Castel San Pietro Terme (IT)

(72) Inventors: Massimo Notargiacomo, Castel San Pietro Terme (IT); Giulio Gabelli, Castel San Pietro Terme (IT); Fabrizio Marchese, Castel San Pietro Terme (IT); Alessandro Pagani, Castel San Pietro Terme (IT)

(73) Assignee: Teko Telecom S.r.l., Castel San Pietro Terme (IT)

( * ) Notice: Subject to any disclaimer, the term of this patent is extended or adjusted under 35 U.S.C. 154(b) by 155 days.

(21) Appl. No.: 16/649,764

(22) PCT Filed: Sep. 17, 2018

(86) PCT No.: PCT/IB2018/057105
§ 371 (c)(1),
(2) Date: Mar. 23, 2020

(87) PCT Pub. No.: WO2019/064118
PCT Pub. Date: Apr. 4, 2019

(65) Prior Publication Data
US 2021/0368354 A1    Nov. 25, 2021

(30) Foreign Application Priority Data

Sep. 29, 2017   (IT) .............................. 102017109664

(51) Int. Cl.
*H04W 16/18* (2009.01)
*H04W 56/00* (2009.01)
(Continued)

(52) U.S. Cl.
CPC ....... *H04W 16/18* (2013.01); *H04W 56/0005* (2013.01); *H04W 84/20* (2013.01); *H04W 88/085* (2013.01)

(58) Field of Classification Search
CPC ............. H04W 16/18; H04W 56/0005; H04W 88/085; H04W 84/20
See application file for complete search history.

(56) References Cited

U.S. PATENT DOCUMENTS 9,743,035 B2 *  8/2017  Stewart .......... H04N 21/440218
11,128,398 B2 *  9/2021  Carsello ................ H04L 1/0046
(Continued)

OTHER PUBLICATIONS

"CPRI Specification V7.0", Oct. 9, 2015; Ericsson AB, Huawei, NEC Corporation, Alcatel Lucent, Nokia (Year: 2015).*

*Primary Examiner* — Afshawn M Towfighi
(74) *Attorney, Agent, or Firm* — David B. Tingey; Bryant J. Keller; Kirton McConkie

(57) ABSTRACT

System having baseband units; a radio equipment controller module; radio equipment modules coupled to a physical antenna port having a slave port coupled to a master port of the radio equipment controller module or another radio equipment module. The radio equipment modules receive an uplink antenna-carrier stream from a physical antenna port and transmit the stream to its slave port and, if a master port is connected to another radio equipment module, it synchronizes and sums the stream with an uplink antenna-carrier stream from said master port, creating a summed uplink antenna-carrier stream transmitted to its slave port. The radio equipment modules receive a downlink antenna-carrier stream from the radio equipment controller module or another radio equipment module to its slave port for transmission to said physical antenna port and, if a master port is connected to another radio equipment module, forwards the downlink antenna-carrier stream to the master port.

22 Claims, 5 Drawing Sheets

(51) Int. Cl.
 *H04W 84/20* (2009.01)
 *H04W 88/08* (2009.01)

(56) References Cited

U.S. PATENT DOCUMENTS

| | | |
|---|---|---|
| 2006/0034364 A1* | 2/2006 | Breitzmann ............ H02P 27/08 |
| | | 375/238 |
| 2011/0237178 A1 | 9/2011 | Seki et al. |
| 2014/0024402 A1 | 1/2014 | Singh |
| 2014/0146905 A1 | 5/2014 | Zavadsky et al. |
| 2015/0146613 A1 | 5/2015 | Shor |
| 2017/0019897 A1* | 1/2017 | Bennett ............. H04W 72/0446 |
| 2020/0045661 A1* | 2/2020 | Verso ................ H04W 56/0015 |
| 2021/0190971 A1* | 6/2021 | Vasilyuk ................ G01S 19/54 |

* cited by examiner

FRONTHAUL SYSTEM FOR A WIRELESS TELECOMMUNICATION NETWORK HAVING UPLINK SYNCHRONIZATION AND SUMMING

TECHNICAL FIELD

The present invention relates to a fronthaul system for a wireless telecommunication network.

BACKGROUND ART

In the field of telecommunications, particularly with reference to fronthaul deployment, it is known that Base Band Units (BBU) are connected to the Remote Radio Heads (RRH) through a dedicated optical cable link. Depending on the number of bands and operators the number of dedicated connections can rapidly increase, therefore a lighter solution might be a better choice in terms of both CAPEX (CAPital Expenditure) and OPEX (OPerating Expenditure). The limitation of the current installations resides in the CPRI (Common Public Radio Interface) protocol that each vendor customizes in its own proprietary way, so that the direct BBU-RRH interface is not open to other vendors' equipment.

Moreover, the use of proprietary customized CPRI protocols do not exploit the full potential of the dedicated fiber connection, as the digital data occupies only a small fraction of the available bandwidth.

Disclosure of the Invention

The main aim of the present invention is to overcome the current limitations by providing a newly-conceived fronthaul system for a wireless telecommunication network which permits to optimize the number of fiber needed for the fronthaul and enables features such as multicast or broadcast, redundant architectures, and multi-operator multi-band hardware sharing.

The invention consists of a wireless communication system comprising:
- multiple base station baseband (BBU), preferably implemented by software instances running on a general-purpose hardware;
- multiple Point Of Interface (POI) or, generally speaking, Radio Equipment (RE);
- a fronthaul digital network connecting the BBU pool and the REs.

The fronthaul network transports downlink (DL) and uplink (UL) antenna-carrier streams, control and synchronization signalling.

The digital fronthaul network can be either based on CPRI or any other standard exploiting a synchronous transmission protocols such, for example, Open Base Station Architecture Initiative (OBSAI).

Preferably, the fronthaul network according to the present invention is implemented by means of a custom CPRI protocol implementation.

The fronthaul network according to the present invention allows to:
- reserve a certain number of slots of the CPRI frame to a particular data stream; this allows to map the antenna-carrier streams in well-known positions into the digital frame;
- dynamically assign one or more DL carrier-antenna streams to the REs, in fact knowing the precise data location inside the frame, it is possible for the RE to pick-up only the desired streams;
- dually, the UL RF signal belonging to a specific antenna-carrier stream can be received by a certain RE and then added to its respective digital counterpart into the fronthaul frame after down conversion to baseband and A/D conversion;
- reconfigure runtime the association among the REs and all the baseband carrier-antenna streams in the digital link;
- reserve different fronthaul data rates to each carrier depending, for example, on its bandwidth;
- cascade multiple REs and add/forward antenna-carrier streams;
- synchronize the DL transmission of the same antenna-carrier stream among all REs that make use of a specific carrier, so that all data belonging to a well-defined time instant goes on-air in that exact time;
- compensate the UL delays due to the data forwarding of daisy-chained REs exploiting the same antenna-carrier stream.

The above mentioned objects are achieved by the present fronthaul system for a wireless telecommunication network according to the features of claim 1. Furthermore, the above mentioned objects are achieved by the present method for controlling an uplink in a wireless telecommunications fronthaul network according to the features of claim 10.

Furthermore, the above mentioned objects are achieved by the present method for controlling a downlink in a wireless telecommunications fronthaul network according to the features of claim 19.

BRIEF DESCRIPTION OF THE DRAWINGS

Other characteristics and advantages of the present invention will become better evident from the description of a preferred, but not exclusive embodiment of a fronthaul system for a wireless telecommunication network, illustrated by way of an indicative but non-limiting example in the accompanying Figures, in which.

WAYS OF CARRYING OUT THE INVENTION

With particular reference to such illustrations, globally indicated with reference FS is a fronthaul system for a wireless telecommunication network.

The fronthaul system FS comprises:
- a plurality of baseband units BB;
- at least a radio equipment controller module REC coupled to the plurality of baseband units BB;
- a plurality of radio equipment modules RE, wherein each of the plurality of radio equipment modules RE is coupled to at least one physical antenna port ANT.

Furthermore, each of the radio equipment module RE has at least a slave port S and at least a master port M, wherein the slave port S of each of the radio equipment module RE is coupled to a master port M of the radio equipment controller module REC or to a master port M of another radio equipment module RE.

Therefore, a first subset of the plurality of radio equipment modules RE are directly coupled to the at least one radio equipment controller module REC, and a second subset of the radio equipment modules RE are indirectly coupled to the at least one radio equipment control module REC through one or more others radio equipment modules RE.

Figure 1:
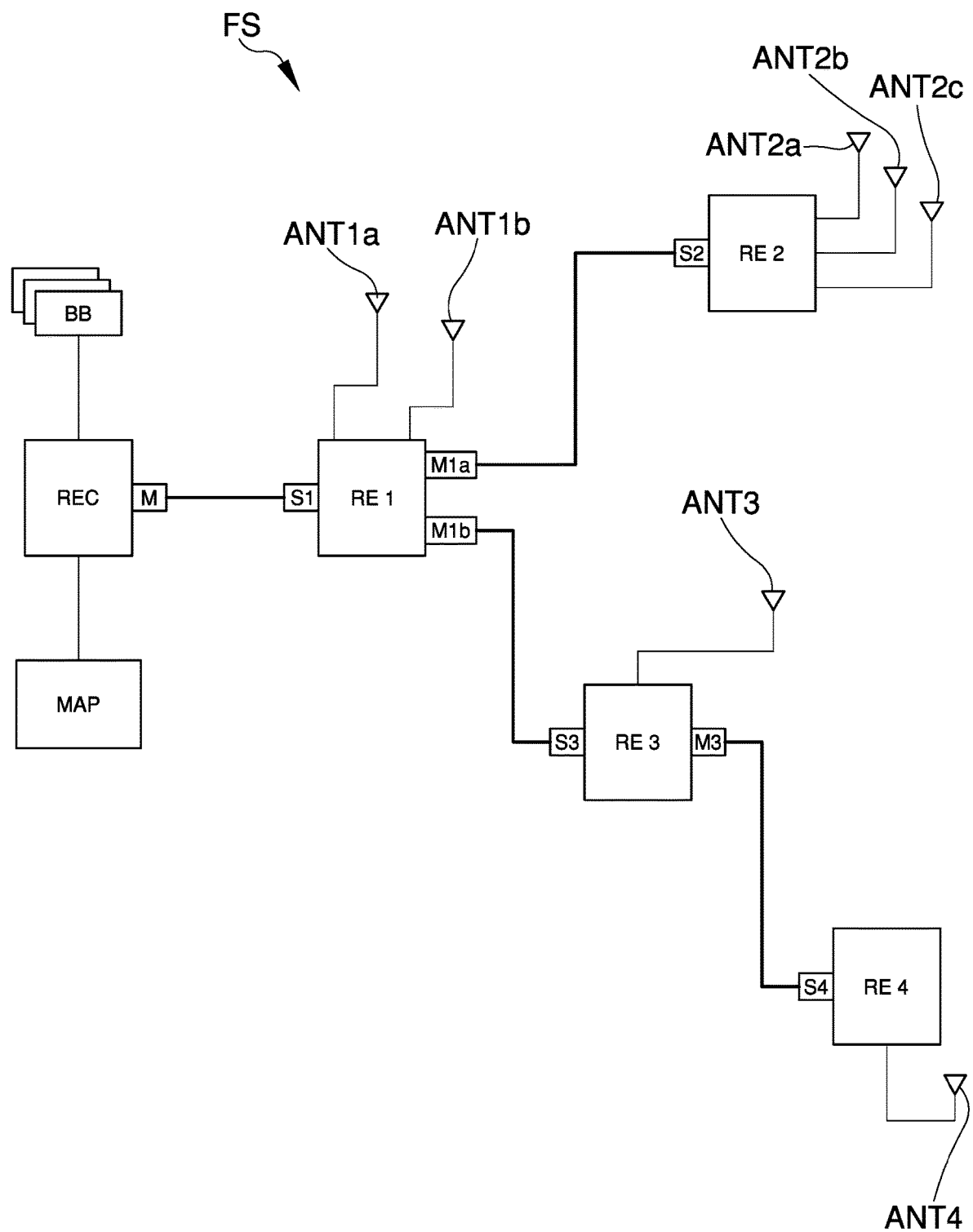
FIG. 1 shows a possible first embodiment of the fronthaul system according to the invention.

FIG. 1 shows a first possible and simplified embodiment of the fronthaul system FS according to the invention, wherein the system comprises one radio equipment control module REC and a plurality of radio equipment modules RE1, RE2, RE3, RE4. Particularly, a first radio equipment module RE1 is directly connected to the radio equipment control module REC, a second and a third radio equipment module RE2 and RE3 are connected to the first radio equipment module RE1, and a further fourth radio equipment module RE4 is connected to the third radio equipment module RE3.

Figure 2:
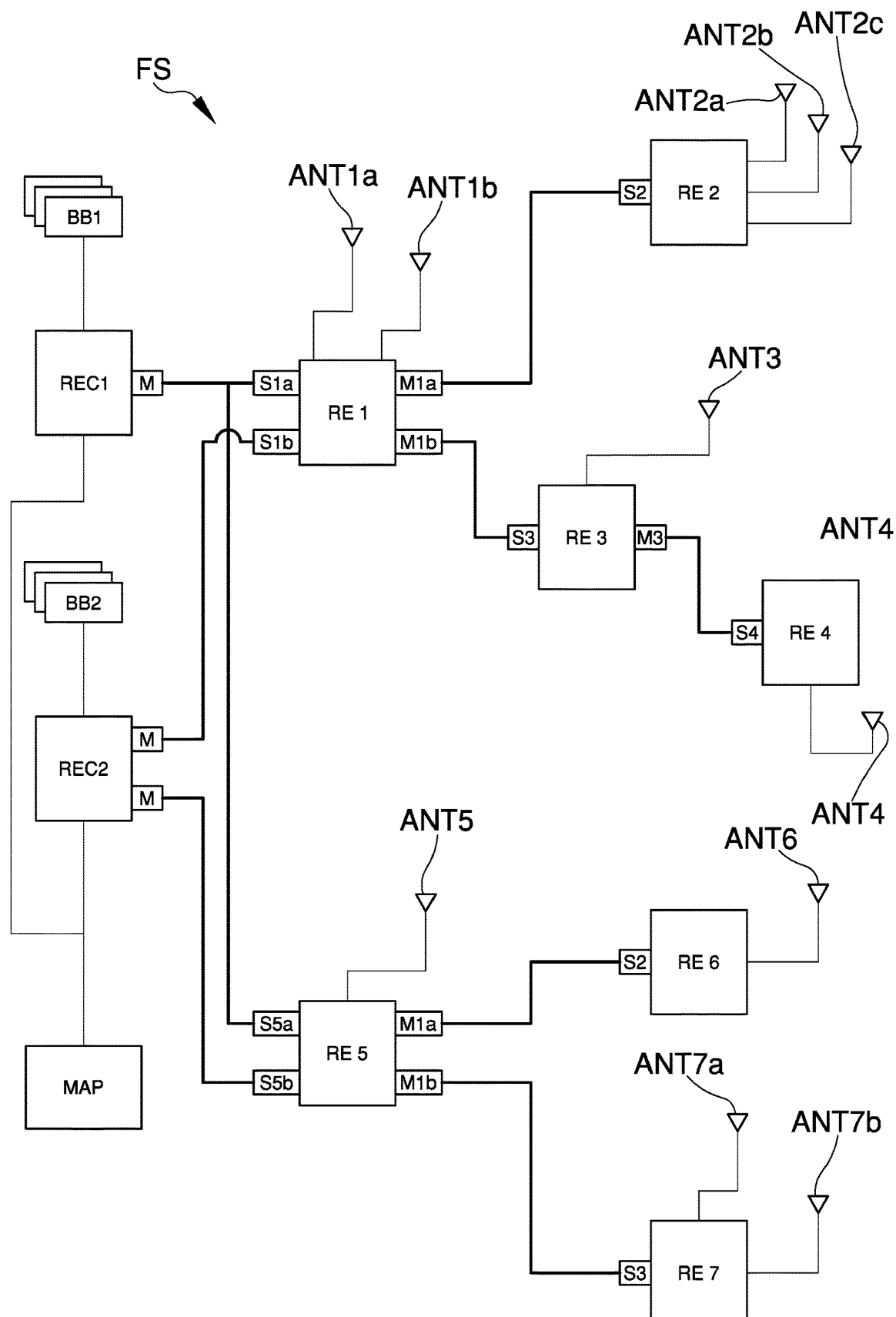
FIG. 2 shows a possible second embodiment of the fronthaul system according to the invention.

The fronthaul system FS according to the invention can comprise a plurality of radio equipment controller modules REC coupled to respective pluralities of baseband units BB, wherein each radio equipment controller module REC is configured to send at least a corresponding downlink antenna-carrier stream. As an example, FIG. 2 shows a second possible embodiment of the fronthaul system FS according to the invention, wherein the system comprises two different radio equipment control modules REC1, REC2, coupled to respective baseband units BB1 and BB2, and a plurality of radio equipment modules RE1, RE2, RE3, RE4, RE5, RE6, RE7. Particularly, according to this possible embodiment, a first radio equipment module RE1 is directly connected to a first radio equipment control module REC1, a second and a third radio equipment module RE2 and RE3 are connected to the first radio equipment module RE1, and a further fourth radio equipment module RE4 is connected to the third radio equipment module RE3. Furthermore, a fifth radio equipment module RE5 is directly connected to a second radio equipment control module REC2 and a sixth and a seventh radio equipment module RE6 and RE7 are connected to the fifth radio equipment module RE5.

Further different embodiments of the fronthaul system FS, with a different number and a different configuration of radio equipment control modules REC and radio equipment modules RE, are not excluded.

The digital fronthaul system FS can be either based on CPRI or any other standard exploiting a synchronous transmission protocols such, for example, Open Base Station Architecture Initiative (OBSAI).

Preferably, the fronthaul system FS is implemented by means of a custom CPRI protocol implementation.

Particularly, each of the radio equipment modules RE is configured to receive an uplink antenna-carrier stream from each of its at least one corresponding physical antenna port ANT and to transmit the received uplink antenna-carrier stream to its CPRI slave port S.

If the radio equipment module RE has at least a master port M connected to at least another radio equipment module RE, it is configured to synchronize and sum the received uplink antenna-carrier stream with at least one CPRI uplink antenna-carrier stream received from the CPRI master port M, in order to create a summed uplink antenna-carrier stream, and it is also configured to transmit the summed uplink antenna-carrier stream to its CPRI slave port S. Furthermore, each of the radio equipment modules RE is configured to receive a downlink antenna-carrier stream from the radio equipment controller module REC or from another radio equipment module RE to its CPRI slave port S for the transmission to at least one of the physical antenna port ANT.

If the radio equipment module RE has at least a master port M connected to at least another radio equipment module RE, it is configured to forward at least part of the downlink antenna-carrier stream to the CPRI master port M.

Preferably, the slave ports S and the master ports M of the radio equipment modules RE are CPRI ports. However, different embodiments are not excluded. The system FS according to the invention also comprises at least a mapping manager module MAP coupled to the at least one radio equipment control module REC and to each of the plurality of radio equipment modules RE.

The mapping manager module MAP is configured for handling the assignment of the uplink and downlink antenna-carrier streams to the one or more radio equipment controller modules REC and to the radio equipment modules RE.

Particularly, the downlink IQ data of one antenna-carrier stream should be generated within one and only one radio equipment control module REC, and should be received by at least one of the radio equipment modules RE, whereas uplink IQ data should be generated by the same radio equipment modules RE and sent to the same radio equipment control module REC.

The mapping manager module MAP can be integrated within a radio equipment controller module REC.

Preferably, the mapping manager module MAP communicates with each of the plurality of radio equipment modules RE via a plurality of CPRI connections.

For example, the connection can be realized via a CPRI Fast C&M link that implements an Ethernet protocol or via a CPRI Slow C&M link that implements an HDLC protocol.

Alternatively, the mapping manager can communicate with each of the plurality of radio equipment modules RE via a CPRI Vendor Specific channel that implements a custom protocol.

The mapping manager module MAP is configured to dynamically reconfigure each of the radio equipment controller modules REC and each of the radio equipment modules RE.

Particularly, the mapping manager module MAP is configured to instruct at least one of the radio equipment modules RE to selectively retrieve a designated corresponding downlink antenna-carrier stream from a designated CPRI slave port S for transmission to at least a designated physical antenna port ANT.

Furthermore, the mapping manager module MAP is configured to instruct at least one of said radio equipment modules RE to forward a designated downlink antenna-carrier to the at least one designated corresponding CPRI master ports M.

Particularly, the mapping manager module MAP can be configured to instruct one or more radio equipment modules RE to forward an incoming downlink antenna-carrier on the one or more designated CPRI ports, using the same AxC container mapping within one Basic Frame used in the incoming CPRI basic frame.

Furthermore, the mapping manager module MAP is configured to dynamically instruct a designated radio equipment module RE to synchronize and sum an uplink carrier-antenna stream received from at least one physical antenna port ANT with a designated plurality of CPRI uplink antenna-carrier streams. The designated uplink antenna-carrier stream comprises a designated CPRI Antenna Carrier (AxC).

Figure 3:
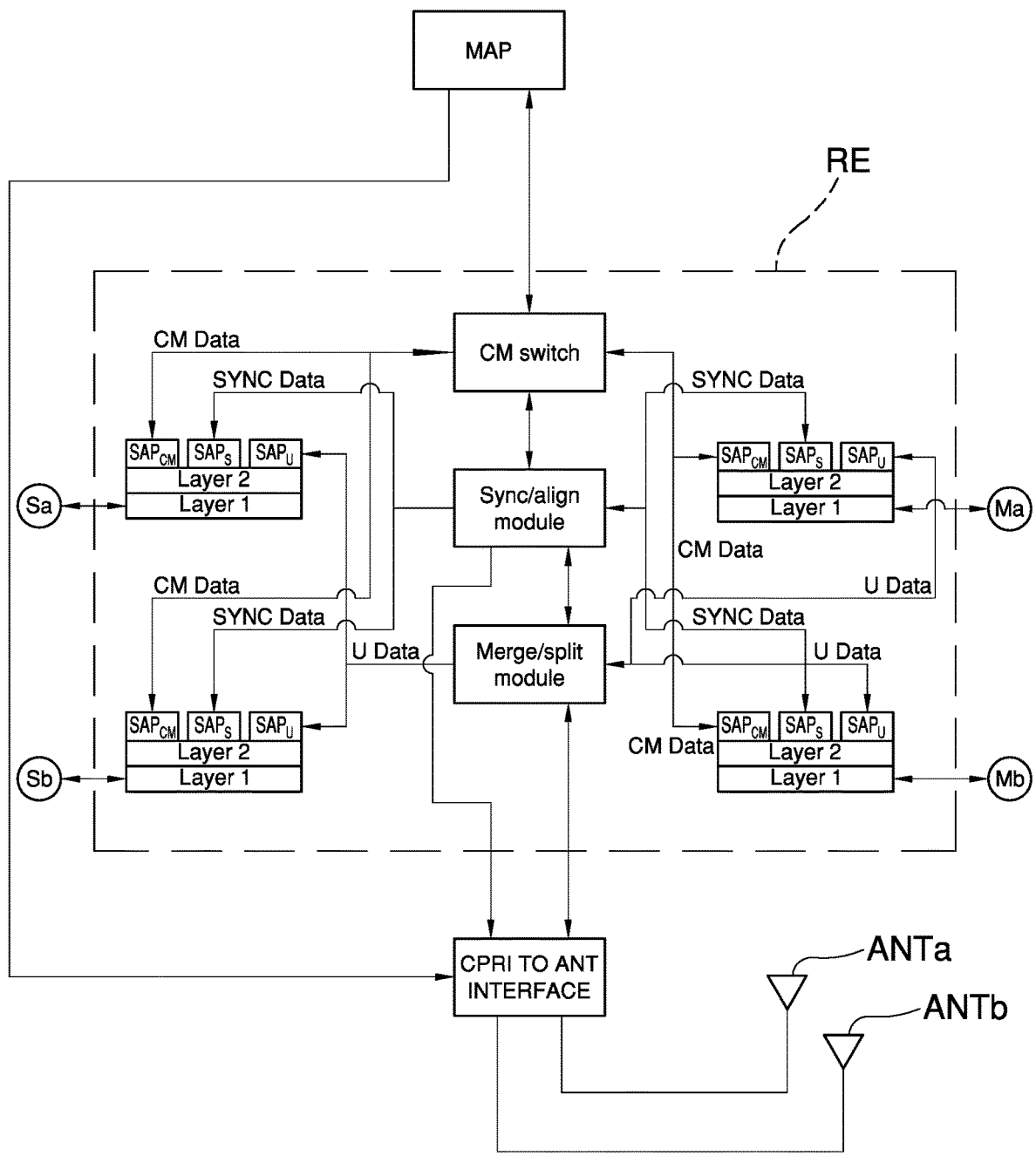
FIG. 3 is a block diagram of a radio equipment module according to the invention.

The radio equipment control modules REC and the radio equipment modules RE in the system FS shall manage the different components of the CPRI protocol, namely the Control and Management data (CM data in FIG. 3), the synchronization (SYNC data in FIG. 3), and the actual IQ data that contains the useful information (U data in FIG. 3).

Particularly, each radio equipment module RE comprises at least a sync/align module connected to each slave port S and each master port M of the radio equipment module RE and configured to merge the downlink SYNC data flows coming from all CPRI slave ports S and to send the merged SYNC data to all the CPRI master ports M and towards to all the air interfaces ANT. The sync/align module is also configured to merge the SYNC data flows coming from CPRI master ports M and from the air interface ANT into one SYNC data flow and to send said stream to the CPRI slave ports S.

Furthermore, each radio equipment module RE comprises at least a CM switch connected to each slave port S and each master port M of the radio equipment module RE and configured to switch the data packets carrying the CM data flow.

Furthermore, each radio equipment module RE comprises at least a merge/split module connected to each slave port S and each master port M of the radio equipment module RE and configured to merge the downlink U data flows coming from all CPRI slave ports S and to send the merged U data to all the CPRI master ports M and towards to all the air interfaces ANT. The merge/split module is further configured to merge the U data flows coming from CPRI master ports M and from the air interface ANT into one U data flow and to send said flow to the CPRI slave ports S.

Moreover, the radio equipment control modules REC and the radio equipment modules RE with mapper/demapper (i.e., mux/demux) can be configured to map Antenna-Carrier samples into the CPRI frame in a programmable way.

As an example, FIG. 3 shows a block diagram of a possible radio equipment module RE according to the invention, including its local circuitry for IQ samples processing and radio interface (CPRI to ANT Interface).

Referring to FIG. 3, the downlink SYNC data flows coming from all CPRI slave ports Sa, Sb on the same node are merged into one SYNC data flow by a sync/align module and sent to all the CPRI master port Ma, Mb Service Access Point $SAP_S$ and towards the air interface ANTa, ANTb.

Conversely, in uplink the Service Access Point $SAP_S$ coming from CPRI master ports Ma, Mb and from the air interface ANTa, ANTb on the same node is merged into one $SAP_S$ by the sync/align module and sent to the CPRI slave ports Sa, Sb.

In the case of IQ data, in the downlink U data flows coming from CPRI slave ports Sa, Sb on the same node are merged into one U data flow by the merge/split module and sent to the $SAP_{IQ}$ of CPRI master ports Ma, Mb and towards the air interface ANTa, ANTb.

In the uplink, $SAP_{IQ}$ coming from CPRI master ports Ma, Mb and from the air interface ANTa, ANTb on the same node are merged into one $SAP_{IQ}$ and sent to the CPRI slave ports Sa, Sb.

Furthermore, CM data traffic is managed by switching packets, by means of the CM switch connected to each slave port S and each master port M of the radio equipment module RE.

In the following it is disclosed the method 100 for controlling an uplink process in a wireless telecommunications fronthaul system. Particularly, the method 100 is used for processing uplink IQ data.

Figure 4:
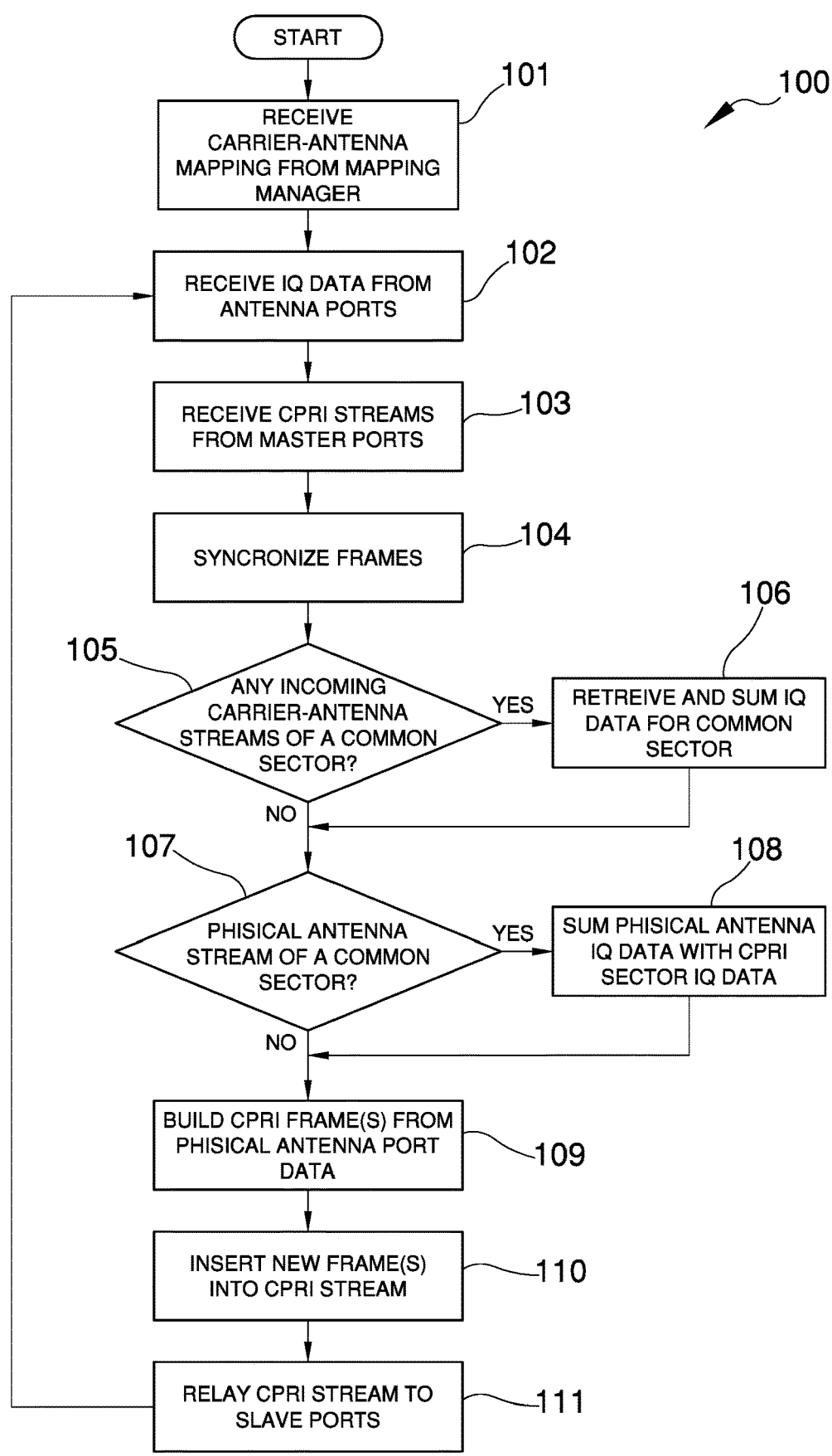
FIG. 4 shows a block diagram of a method according to the invention for controlling an uplink in a wireless telecommunications fronthaul network.

The method 100 is also schematically showed in FIG. 4.

The method 100 can be implemented by each of the radio equipment modules RE of the wireless telecommunications fronthaul system FS according to the invention.

First of all, the method 100 comprises receiving an antenna-carrier mapping from the mapping manager MAP (step 101). Particularly, the mapping manager MAP provides all the information regarding the location of specific carrier-antenna stream within the CPRI frames.

The method 100 comprises:
  receiving at least one uplink sample stream data (IQ data) from at least one physical antenna port ANT (step 102), and
  eventually, if another remote unit RE is connected to the master ports M, receiving at least one uplink antenna-carrier stream from at least a CPRI master port M (step 103).

Therefore, the radio equipment module RE receives antenna stream data from its antenna ports ANT as well as any incoming uplink CPRI data from other upstream radio equipment modules RE.

Particularly, in the case of a plurality of master ports M, the method 100 comprises the reception of a plurality of uplink antenna-carrier streams, each from one of the CPRI master ports M, wherein each of the uplink antenna-carrier streams include a plurality of incoming AxC Containers. Furthermore, in the case of a plurality of master ports, the method 100 comprises dynamically selecting a designated plurality of CPRI master ports M.

The method 100 further comprises synchronizing the uplink antenna-carrier stream with the uplink sample stream data (step 104).

Subsequently, the method 100 comprises retrieving an uplink antenna-carrier data block (IQ data) from the uplink antenna-carrier streams and summing the synchronized uplink antenna-carrier data blocks together with the uplink sample stream from physical antenna ports ANT to create a summed uplink antenna-carrier data block (steps 105-108).

Particularly, it is executed the retrieving an uplink antenna-carrier data block from each of the AxC Containers.

Furthermore, the step of summing said synchronized uplink antenna-carrier data blocks together with said at least one uplink sample stream from physical antenna port ANT comprises:
  if the mapping manager module MAP is designating multiple antenna-carrier streams as belonging to a single sector and if there are any incoming antenna-carrier streams of a common sector (step 105), summing the synchronized uplink antenna-carrier data blocks to create a partially summed uplink antenna-carrier data block (step 106); and
  if the antenna stream from the at least one antenna port ANT is designated as part of a common sector (step 107), summing the partially summed uplink antenna-carrier data with the at least one uplink sample stream data (step 108).

Then, the method 100 comprises assigning to the summed uplink antenna-carrier data block (IQ data) to a summed uplink antenna-carrier stream (steps 109 and 110).

Particularly, the step of assigning comprises:
  assigning the summed uplink antenna-carrier data block into a summed AxC Container, and mapping corresponding AxC Containers within CPRI frames at the same positions at which the incoming AxC containers were mapped into the incoming CPRI frames.

Furthermore, the method 100 comprises transmitting the summed uplink antenna-carrier stream to at least one CPRI slave port S (step 111).

Particularly, according to method 100 a plurality of CPRI slave port S can be dynamically designated.

Figure 5:
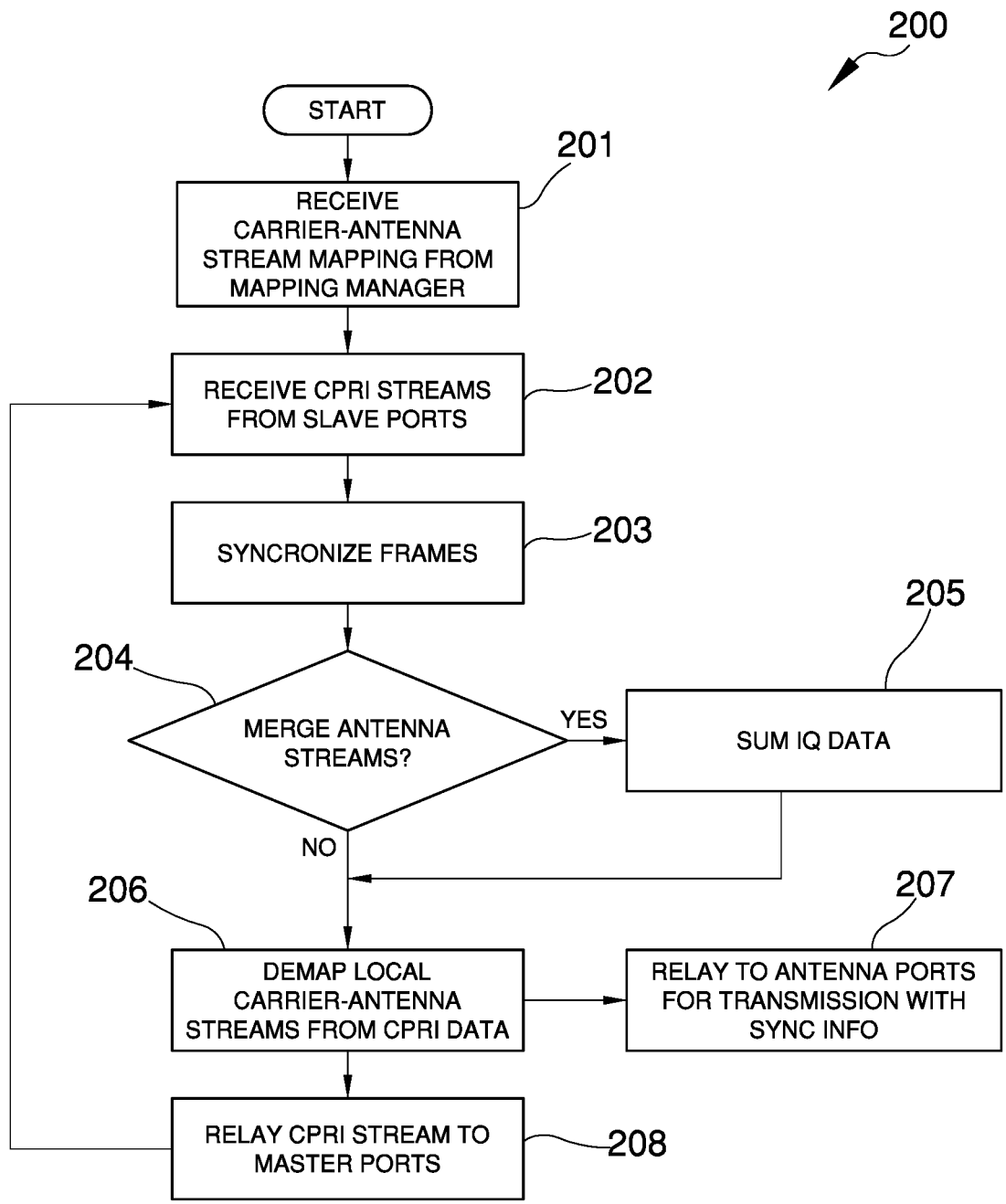
FIG. 5 shows a block diagram of a method according to the invention for controlling a downlink in a wireless telecommunications fronthaul network.

In the following it is disclosed the method 200 for controlling a downlink process in a wireless telecommunications fronthaul system. The method 200 is also schematically showed in FIG. 5.

First of all, the method 200 comprises receiving an antenna-carrier mapping instruction from the mapping manager module MAP (step 201), wherein the antenna-carrier mapping instruction include a plurality of antenna stream identifiers.

Furthermore, the method 200 comprises the following steps:
  receiving a first inbound CPRI data stream via a first CPRI slave port S (step 202);
  retrieving, from said first inbound CPRI data stream, a first designated antenna-carrier stream;
  assigning said first designated carrier-antenna stream to a plurality of designated common carrier-antenna streams, each of the plurality of designated common carrier-antenna streams corresponding to one of the plurality of antenna carrier identifiers.

Particularly, the designated carrier-antenna stream and each of said designated common carrier-antenna streams comprises a CPRI Antenna Carrier (AxC).

The method 200 further comprises the following steps:
  receiving a second inbound CPRI data stream via a second CPRI slave port (step 202);
  retrieving, from the second inbound CPRI data stream, a second designated antenna-carrier stream; and
  merging the second designated antenna-carrier stream into said first designated antenna-carrier stream (steps 204 and 205).

Therefore, if two or more incoming carrier antenna streams have frames intended for a single antenna-carrier, the signals are summed.

Before the merging step, the method 200 preferably comprises a step of synchronizing the incoming frames (step 203).

Furthermore, the method 200 comprises a step of demapping local antenna-carrier streams from CPRI data (step 206) and a step of relaying to antenna ports any for transmission with synchronization info (step 207).

Therefore, if any of the destination antenna-carrier streams are local to the specific radio equipment module RE, then the specific data are stripped out and relayed to the specific antenna port ANT.

Finally, the method 200 comprises transmitting the obtained CPRI streams to the at least one master port M of the radio equipment module RE (step 208).

In practice it has been observed that the described invention achieves the intended purposes.

Particularly, the fronthaul system according to the invention allows to:
  insert in the CPRI frame several arbitrary antenna-carrier streams with no constraints on their bandwidth;
  configure dynamic and custom switching capabilities in CPRI systems, so that each radio equipment module RE can independently pick-up (in downlink) or put (in uplink) antenna-carrier digital data samples;
  enable unicast, multicast or broadcast antenna-carrier data flow through the CPRI fronthaul;
  reconfiguration on-the-fly with no service interruption;
  compensate for all the delays in downlink and uplink due to several REs in daisy-chain (no limitation on the number of cascaded REs, it depends on the technology being used by the system, e.g., LTE, 3G, 2G, etc.);
  sum synchronized uplink samples belonging to the same instant of reception at the antenna connector, so lowering the fronthaul traffic;

Furthermore, the system according to the invention allows reach all the above aims, maintaining time-synchronization among all devices.

The invention claimed is:

1. A fronthaul system for a wireless telecommunication network, comprising:
  a plurality of baseband units;
  least a radio equipment controller module coupled to said plurality of baseband units;
  a plurality of radio equipment modules, wherein each of said plurality of radio equipment modules is coupled to at least one physical antenna port and wherein each of said radio equipment module has at least a slave port and at least a master port,
  wherein the slave port of each of said radio equipment module is coupled to a master port of said radio equipment controller module or to a master port of another radio equipment module,
  wherein each of said radio equipment modules is configured to receive an uplink antenna-carrier stream from said at least one corresponding physical antenna port and to transmit the received uplink antenna-carrier stream to its slave port and, if it has at least a master port connected to at least another radio equipment module, it is configured to synchronize and sum the received uplink antenna-carrier stream with at least one uplink antenna-carrier stream received from said master port to create a summed uplink antenna-carrier stream and to transmit the summed uplink antenna-carrier stream to its slave port, and
  wherein each of said radio equipment modules is configured to receive a downlink antenna-carrier stream from said radio equipment controller module or from another radio equipment module to its slave port for the transmission to at least one of said physical antenna port and, if it has at least a master port connected to at least another radio equipment module, it is configured to forward at least part of said downlink antenna-carrier stream to said master port.

2. The system according to claim 1, comprising at least a mapping manager module coupled to said at least one radio equipment control module and to each of said plurality of radio equipment modules and configured for handling the assignment of said uplink and downlink antenna-carrier streams to said at least a radio equipment controller module and to said radio equipment modules.

3. The system according to claim 1, wherein said slave port and said master port of the radio equipment modules comprise CPRI ports.

4. The system according to claim 2, wherein said slave port and said master port of the radio equipment modules comprise CPRI ports and said mapping manager module communicates with each of said plurality of radio equipment modules via a plurality of CPRI connections.

5. The system according to claim 1, comprising a plurality of radio equipment controller modules coupled to respective pluralities of baseband units, wherein each radio equipment controller module is configured to send at least a corresponding downlink antenna-carrier stream.

6. The system according claim 2, wherein said mapping manager module is configured to dynamically reconfigure said at least one radio equipment controller module and each of the radio equipment modules.

7. The system according to claim 2, wherein said mapping manager module is configured to instruct at least one of said radio equipment modules to selectively retrieve a designated corresponding downlink antenna-carrier stream from a designated slave port for transmission to at least a designated physical antenna port.

8. The system according to claim 2, wherein said mapping manager module is configured to instruct at least one of said radio equipment modules to forward a designated downlink antenna-carrier to the at least one designated corresponding master ports.

9. The system according to claim 2, wherein said mapping manager module is configured to dynamically instruct a designated radio equipment module to synchronize and sum an uplink carrier-antenna stream received from said at least one physical antenna port with a designated plurality of CPRI uplink antenna-carrier streams.

10. A method for controlling an uplink in a wireless telecommunications fronthaul network, comprising at least the following steps executed by a radio equipment module of a fronthaul system:
  receiving at least one uplink sample stream data from at least one physical antenna port of said radio equipment module;
  receiving at least one uplink antenna-carrier stream from at least a master port of said radio equipment module;
  synchronizing said at least one uplink antenna-carrier stream with said at least one uplink sample stream data;
  retrieving an uplink antenna-carrier data block from said at least one uplink antenna-carrier streams;
  summing the synchronized uplink antenna-carrier data blocks together with said at least one uplink sample stream data to create a summed uplink antenna-carrier data block;
  assigning said summed uplink antenna-carrier data block to a summed uplink antenna-carrier stream; and
  transmitting said summed uplink antenna-carrier stream to at least one slave port of said radio equipment module.

11. The method according to claim 10, comprising receiving an antenna-carrier mapping.

12. The method according to claim 10, wherein said step of receiving comprises receiving a plurality of uplink antenna-carrier streams, each from one of a plurality of CPRI master ports, wherein each of said uplink antenna-carrier streams include a plurality of incoming AxC Containers, and wherein each of said incoming AxC Containers are identically mapped within a CPRI frame.

13. The method according to claim 12, wherein said step of retrieving comprises retrieving an uplink antenna-carrier data block from each of said AxC Containers.

14. The method according to claim 13, wherein said step of assigning comprises assigning said summed uplink antenna-carrier data block into a summed AxC Container.

15. The method according to claim 14, wherein said step of assigning said summed uplink antenna-carrier data block into a summed AxC Container comprises mapping corresponding AxC Containers within CPRI frames at the same positions at which the incoming AxC containers were mapped into the incoming CPRI frames.

16. Method according to claim 10, comprising dynamically designating said at least one CPRI slave port.

17. The method according to claim 10, wherein said step of summing said synchronized uplink antenna-carrier data blocks together with said at least one uplink sample stream data comprises:
  summing said synchronized uplink antenna-carrier data blocks to create a partially summed uplink antenna-carrier data block; and
  summing said partially summed uplink antenna-carrier data block with said at least one uplink sample stream data.

18. The method according to claim 10, wherein said step of receiving a plurality of uplink antenna-carrier streams, each from one of a plurality of CPRI master ports, comprises dynamically selecting a designated plurality of CPRI master ports.

19. A method for controlling a downlink in a wireless telecommunications fronthaul network, comprising at least the following steps executed by a radio equipment module of a fronthaul system:
  receiving an antenna-carrier mapping instruction, the antenna-carrier mapping instruction including a plurality of antenna carrier identifiers;
  receiving a first inbound data stream via a first slave port of said radio equipment module;
  retrieving, from said first inbound data stream, a first designated antenna-carrier stream; and
  assigning said first designated carrier-antenna stream to a plurality of designated common carrier-antenna streams, each of the plurality of designated common carrier-antenna streams corresponding to one of the plurality of antenna carrier identifiers.

20. The method according to claim 19, wherein said designated carrier-antenna stream and each of said designated common carrier-antenna streams comprises a CPRI Antenna Carrier.

21. The method according to claim 19, further comprising the following steps:
  receiving a second inbound data stream via a second slave port of said radio equipment module;
  retrieving, from said second inbound data stream, a second designated antenna-carrier stream; and
  merging said second designated antenna-carrier stream into said first designated antenna-carrier stream.

22. The method according to claim 21, comprising transmitting the obtained merged antenna-carrier stream to the at least one master port M of said radio equipment module.

* * * * *